United States Patent [19]

Marier

[11] Patent Number: 4,585,429
[45] Date of Patent: Apr. 29, 1986

[54] V-BELT TYPE CONTINUOUSLY VARIABLE TRANSMISSION

[75] Inventor: Gregory J. Marier, Brooklyn Park, Minn.

[73] Assignee: Yamaha Hatsudoki Kabushiki Kaisha, Iwata, Japan

[21] Appl. No.: 651,910

[22] Filed: Sep. 19, 1984

[51] Int. Cl.$^4$ ............................................. F16H 11/06
[52] U.S. Cl. ....................................... 474/12; 474/19
[58] Field of Search ...................... 474/14, 19, 12, 11, 474/17, 15, 21; 192/54, 70.23

[56] References Cited

U.S. PATENT DOCUMENTS

| | | | |
|---|---|---|---|
| 3,034,367 | 5/1962 | Steuer | 474/19 |
| 3,082,636 | 3/1963 | Steinlein | 474/17 |
| 3,967,509 | 7/1976 | Teal | 474/19 |
| 4,360,353 | 11/1982 | Hattori et al. | 474/19 |
| 4,378,221 | 3/1983 | Huff et al. | 474/19 |

Primary Examiner—Stuart S. Levy
Assistant Examiner—Katherine Matecki
Attorney, Agent, or Firm—Orrin M. Haugen; Thomas J. Nikolai

[57] ABSTRACT

A V-belt continuously variable transmission in which a V-belt is made to run on a drive pulley having a speed responsive mechanism and a driven pulley having a torque responsive mechanism. The torque responsive mechanism of the driven pulley includes a spring cap slidably mounted on a sleeve to which a fixed pulley half or sheave is affixed. The spring cap has a plurality of studs passing through openings formed through the fixed pulley sheave and connected to a movable pulley sheave slidingly mounted on the sleeve. Formed on opposed faces of the fixed pulley sheave and the spring cap are plural arcuate ramps, each including grooves into which balls are inserted to provide rolling contact and reduced friction between the opposed ramps.

8 Claims, 8 Drawing Figures

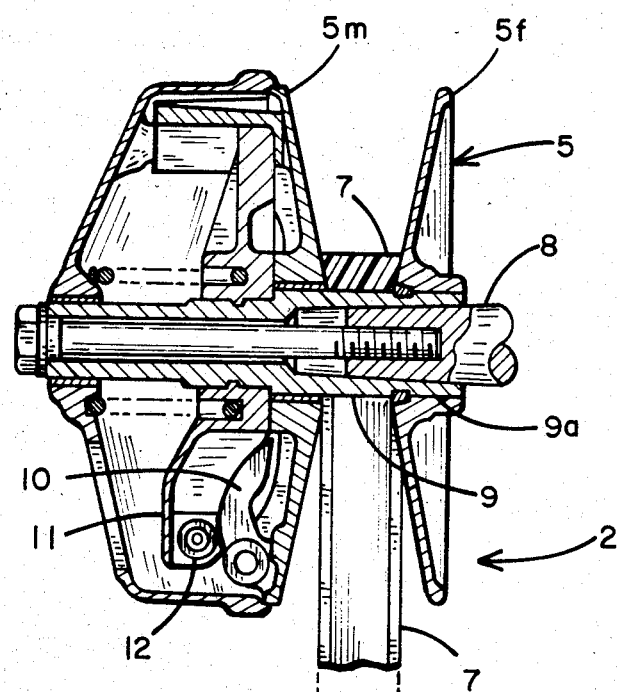
*Fig. 2*
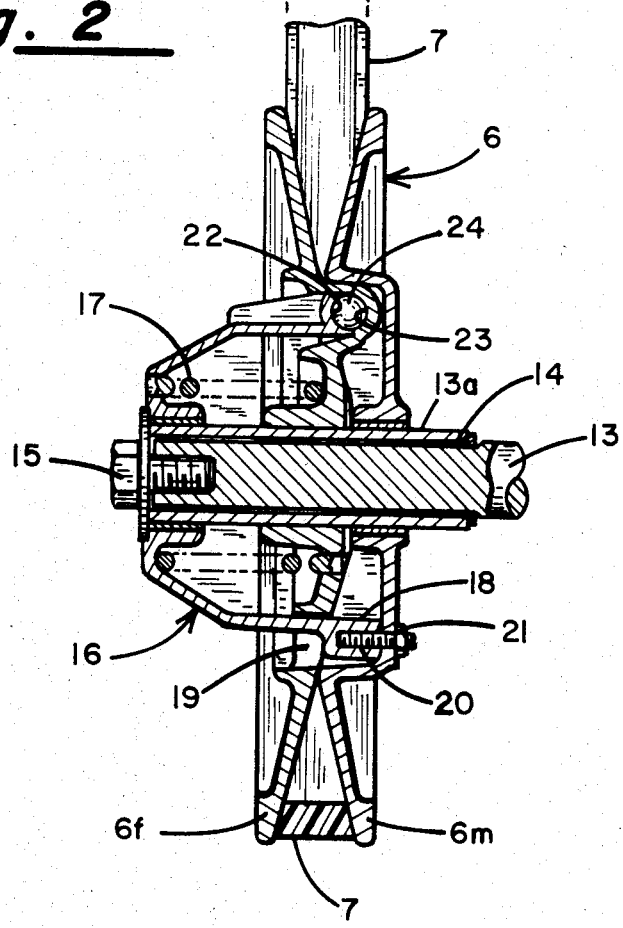

V-BELT TYPE CONTINUOUSLY VARIABLE TRANSMISSION

BACKGROUND OF THE INVENTION

I. Field of the Invention

The present invention relates to an improvement in a V-belt type continuously variable transmission and, more particularly, to a V-belt type continuously variable transmission which is equipped with a torque responsive mechanism exhibiting excellent torque and speed response characteristics.

II. Description of the Prior Art

Generally speaking, snowmobiles commonly use a V-belt type continuously variable transmission. Such a transmission is generally constructed to include a drive pulley and a driven pulley, each of which is composed of a fixed sheave or pulley half fixed in the axial direction and a movable sheave or pulley half which is movable in the axial direction. A V-belt joins the drive pulley and the driven pulley. Moreover, as is disclosed in the Teal U.S. Pat. No. 4,023,635, the V-belt type continuously variable transmission is equipped with a speed responsive mechanism associated with the drive pulley and a torque responsive mechanism associated with the driven pulley so that it can continuously vary the shift ratio between the drive and driven pulley in relation to the drive speed and driven torque. When the torque load upon the driven shaft is increased with the increase in the load upon the drive track, as when the snowmobile runs uphill, the aforementioned torque responsive mechanism transmits an axial force matching that increase from the driven pulley to the drive pulley so that a satisfactory shift ratio may always be attained.

In the aforementioned Teal U.S. Pat. No. 4,023,635, the torque responsive mechanism is comprised of inclined cam surfaces which are opposed to one another and positioned between a spring cap, which is fixed to the movable sheave or pulley half, and a fixed sheave or pulley half. Those opposed inclined cam surfaces are moved in the axial direction relative to each other by the torque loaded upon the driven shaft, while the pulley halves are sliding and turning relative to each other. Hence, the aforementioned movable sheave is moved closer to the fixed sheave by the relative movement caused by the cooperating cam surfaces. As the two sheaves are removed closer together, the effective diameter of the driven pulley is increased and the effective diameter of the drive pulley is decreased so that the torque to be transmitted from the drive pulley to the driven pulley is increased.

The prior art torque responsive mechanism, as represented by the Teal U.S. Pat. No. 4,023,635, has a significant drawback in that it exhibits a high frictional resistance when the opposed inclined cam surfaces move relative to each other. As a result, even if torque fluctuations are imposed upon the driven shaft, because of that frictional resistance, the relative movements of the inclined cam surfaces do not occur simultaneously with those torque fluctuations, but instead a noticeable time lag occurs. Hence, the torque responsive mechanism of the prior art suffers from poor torque response characteristics when torque fluctuations occur on the driven shaft. Another defect of the prior art arrangement is that the torque responsive mechanism has poor speed response characteristics to acceleration or deceleration of the engine. As such, it cannot control the desired engine speed with smoothness and precision.

SUMMARY OF THE INVENTION

It is, therefore, a principal object of the present invention to provide a V-belt type continuously variable transmission which exhibits excellent torque response characteristics to changes in torque imposed on the driven shaft.

Another object of the present invention is to provide a V-belt type continuously variable transmission which has excellent speed response characteristics to changes in speed of the engine.

The V-belt type continuously variable transmission of the present invention is similar to the device of the Teal patent in that it embodies a torque responsive mechanism which is disposed in its driven pulley and is constructed such that there are formed between a spring cap fixed integrally to a movable sheave or pulley half and a fixed sheave or pulley half, inclined cam surfaces which are biased by spring force to be opposed to each other. Unlike the apparatus of the Teal patent, however, the present invention incorporates grooves in the mating cam surfaces, the cam surfaces being inclined with respect to the axial direction of a driven shaft and roller members, preferably balls, are held between those inclined and opposed cam grooves. The inclusion of balls between the two inclined cam grooves results in relative rolling contact between the cam surfaces which substantially lowers frictional resistance between them. Hence, they can sensitively respond to either the torque fluctuations of the driven shaft or speed variations of the drive shaft.

Still another object of the present invention is to provide in a V-belt type continuously variable transmission a driven pulley which is easy to assemble in that the balls or rollers are captured between grooves formed on the mating cam surfaces.

Other objects, features and advantages of the present invention will become apparent from the following description taken in conjunction with the embodiment thereof with reference to the accompanying drawings, in which like numerals in the several views refer to corresponding parts.

DESCRIPTION OF THE DRAWINGS

FIG. 2 is a longitudinal section showing the same V-belt type continuously variable transmission with its drive motor and load portions being omitted;

DESCRIPTION OF THE PREFERRED EMBODIMENT

Figure 1:
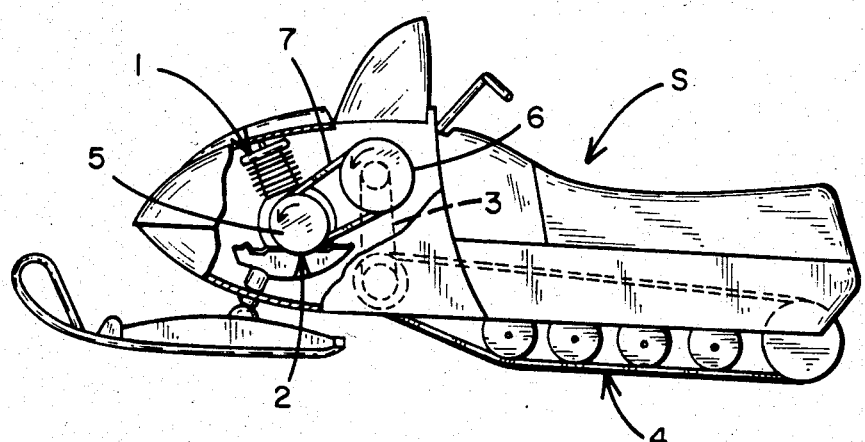
FIG. 1 is a side elevation showing a snowmobile which is equipped with a V-belt type continuously variable transmission according to the present invention.

In FIG. 1, a snowmobile is indicated generally at S and is equipped with an engine 1 mounted on the front portion of the snowmobile body, a V-belt type continuously variable transmission 2 at the output side of the engine 1, and a drive track 4 disposed beneath the body. The engine 1 is adapted to drive the drive track 4 through the aforementioned V-belt type continuously variable transmission 2 and a chain 3. The V-belt continuously variable transmission 2 is constructed such that it is equipped with a drive pulley 5 connected to the output shaft of the engine 1 and a driven pulley 6 which is operatively coupled by the chain 3 to the track's drive sprocket. A V-belt 7 extends between the drive pulley 5 and the driven pulley 6.

FIG. 2 shows the detail of the V-belt type continuously variable transmission 2 thus far described. The drive pulley 5 at the drive side of the continuously variable transmission 2 is composed of a fixed pulley half or sheave 5f and a movable pulley half or sheave 5m. The fixed sheave 5f is fastened through a thread 9a to a drive shaft 9, which is fixed integrally to a crank shaft 8, so that it cannot move in the axial direction. On the other hand, the movable sheave 5m is constructed to move in the axial direction relative to the aforementioned drive shaft 9.

The movable sheave 5m has a weight 10 hinged thereto at a position close to the circumferential edge of the back thereof such that the curved side face of the weight 10 abuts against a roller 12 which is supported on a bracket 11 fixed on the drive shaft 9. The weight 10 constitutes a speed responsive element and is adapted to urge the movable drive sheave 5m toward the fixed drive sheave 5f under influence of centrifugal force. That is, as engine r.p.m. increases, the curved face abutting against the roller 12 pushes the movable sheave 5m to the right toward the fixed sheave 5f to vary (increase) the effective diameter of the drive pulley 5 and shifting the V-belt 7 outward. The drive pulley assembly 5 is entirely conventional and it is to be understood that still other known mechanism may be used as that speed responsive mechanism.

The driven pulley 6 is attached to a drive shaft 13 and, like the drive pulley 5, is composed of a fixed sheave 6f and a movable sheave 6m. The fixed sheave 6f is press fit or integrally cast onto a sleeve 13a which is splined at 14 to the driven shaft 13 and which is also fastened by means of a bolt 15 screwed into the end of the driven shaft 13. On the other hand, the aforementioned movable sheave 6m is provided with suitable sleeve bearings between it and the sleeve 13a so that it can move freely in the axial direction.

Figure 3:
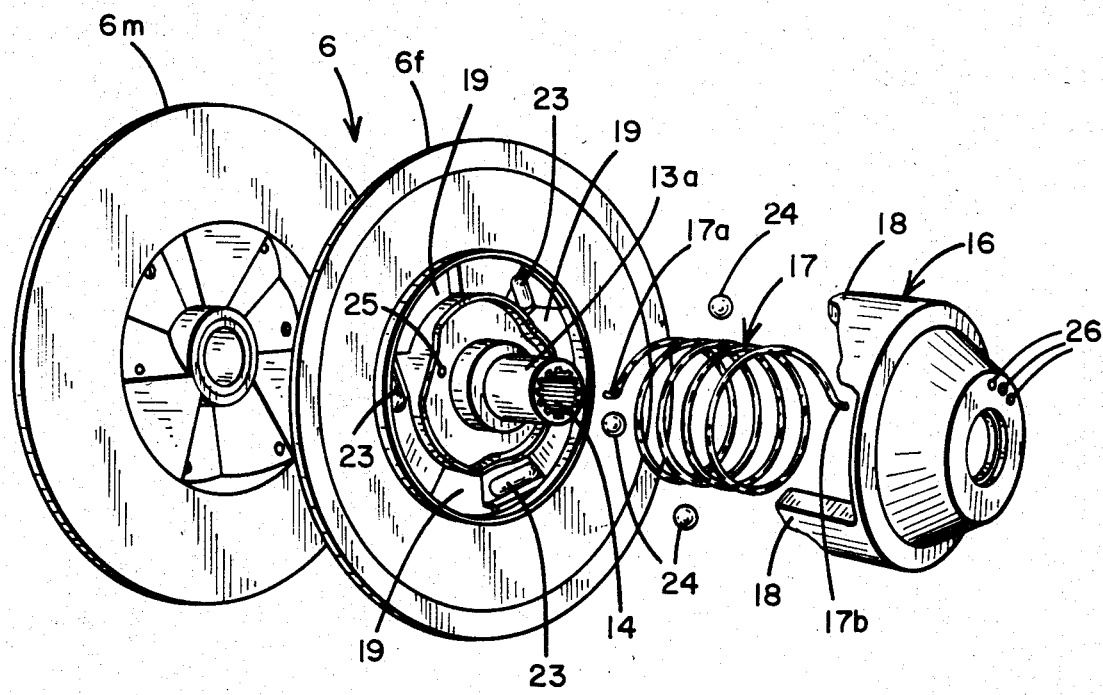
FIG. 3 is an exploded perspective view showing the parts of the driven pulley portion of the V-belt continuously variable transmission.
Figure 4:
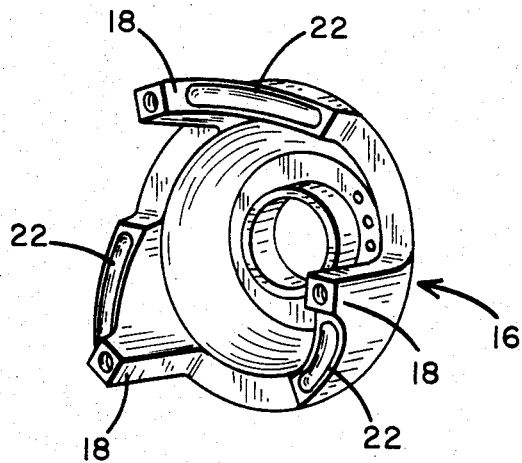
FIG. 4 is a perspective view showing in detail the spring cap of portion of FIG. 3 and taken from the opposite side.
Figure 5:
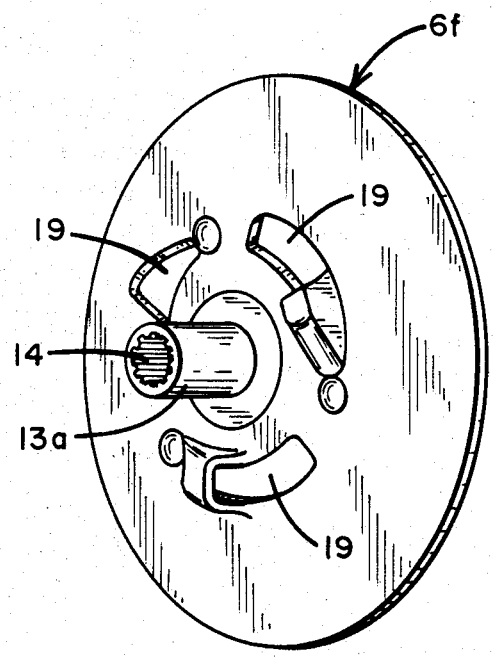
FIG. 5 is a perspective view showing the fixed sheave or pulley half of the parts shown in FIG. 3 and taken from the opposite side.

To the side face of the movable sheave 6m of the aforementioned driven pulley 6, there is attached a spring cap 16 in which a coil spring 17 is mounted under compression and torsion. As shown in the exploded view and the parts views of FIGS. 3-5, the aforementioned spring cap 16 is equipped with three spacer studs as at 18 which are spaced equally in the radial direction. Those supporting spacer studs 18 pass through holes 19 formed in the fixed sheave 6f and the ends thereof abut the inner side face of the movable sheave or pulley half 6m and are attached thereto by means of stud bolts 20 and nuts 21 (FIG. 6). The aforementioned coil spring 17 is compressed between the inner face of the spring cap 16 and the outer side face of the fixed sheave 6f to bias the spring cap 16 apart from the fixed sheave 6f and the movable sheave 6m toward the fixed sheave 6f.

Proximate the location where the spacer studs 18 of the spring cap 16 abut the outer side face of the fixed sheave 6f, there are formed on the spring cap 16 and fixed sheave 6f, respectively, inclined cam surfaces having grooves 22 and 23 formed therein. They extend along the circumferential directions of both the spring cap 16 and the fixed sheave 6f, respectively, and are inclined with respect to the axial direction of the driven shaft 13, such that they are opposed to each other. Inserted between the two juxtaposed inclined cam grooves 22 and 23 are balls or roller members which are preferably made of a material having a self-lubricating property, such as polyacetal, polyamide or polyester. It has also been found that three pairs of the inclined cam grooves 22 and 23 assist in maintaining the sheaves 6f and 6m in a parallel relation to one another throughout the range of motion of these parts.

The inclined cam grooves 22 and 23 holding the aforementioned balls 24 together comprise a torque responsive mechanism in the present invention. Assuming that the vehicle is operating at a steady load condition, such that the engine and vehicle speed are constant and then an additional torque load is applied to the drive shaft 13, the inclined cam grooves 22 at the side of the spring cap 16 will move in the axial direction relative to the inclined cam grooves 23 at the side of the fixed sheave 6f by the axial component of the increased torque. During this movement, the balls 24 create rolling friction rather than sliding friction between the opposed cam surfaces to move the movable sheave 6m toward the fixed sheave 6f. As a result, the effective diameter of the driven pulley 6 turned by the V-belt 7 is increased whereas the effective diameter of the drive pulley 5 is decreased. A balanced shift ratio between the drive pulley 5 to the driven pulley 6 is obtained and the engine rpm may remain at a desired value irrespective of the torque change.

Figure 6A:
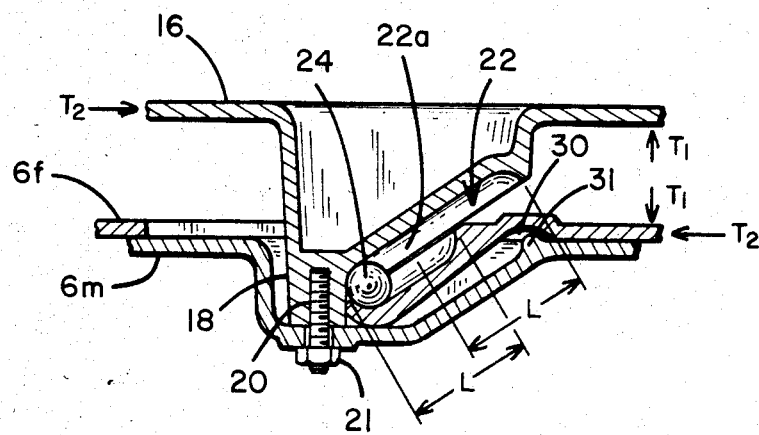
FIG. 6A is a longitudinal section taken along the inclined cam grooves and showing the orientation of parts immediately after the assembly of FIG. 3 is completed.
Figure 6B:
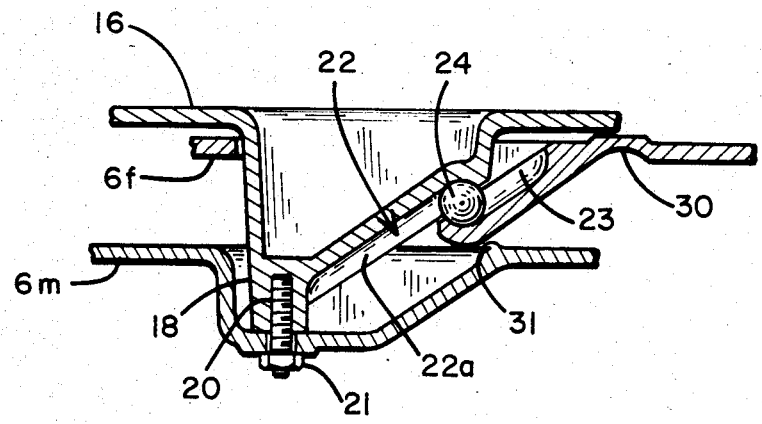
FIG. 6B is a longitudinal section taken along the inclined cam grooves and showing the orientation of the parts when the effective diameter of the driven pulley is at its minimum.
Figure 6C:
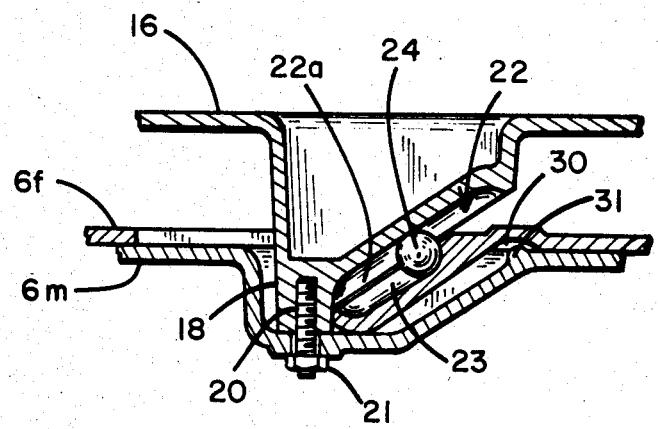
FIG. 6C is a longitudinal section taken along the inclined cam grooves and showing the orientation of the parts when the effective diameter of the driven pulley is at its maximum.

As can be seen from FIGS. 6A-6C, the inclined cam grooves 22 at the side of the spring cap 16 are longer than the inclined cam grooves 23 at the side of the fixed sheave 6f. Specifically, the inclined cam grooves 23 at the side of the fixed sheave 6f are designed to have such a length, L, as is necessary for the maximum relative displacement for responding to the aforementioned torque fluctuations. The inclined cam grooves 22 at the side of the spring 16, however, are formed to have an extended groove portion 22a in addition to the above-specified length, L. Thanks to the mutual groove-length relationship thus far described, the assembly of the mechanism can be facilitated. That is, the aforementioned spring cap 16 may be more readily assembled together with the coil spring 17 and the balls 24 to the fixed sheave 6f and the movable sheave 6m, all as will be described with greater particularity hereinbelow.

During assembly, the movable sheave 6m and the fixed sheave 6f are first placed one on the other in a horizontal orientation with the inclined cam grooves 23 of the fixed sheave or pulley half 6f facing up. Next, the balls 24 are dropped into the aforementioned three inclined cam grooves 23 and they roll down the inclined cam grooves 23 until they rest at the lowermost position illustrated in FIG. 6A.

Next, one bent end 17a (FIG. 3) of the coil spring 17 is inserted into a locking hole 25 formed in the fixed sheave 6f, and the other bent end 17b is inserted into one of a plurality of locking holes, as at 26, formed in the spring cap 16. While being held in this state, the spring cap 16 is twisted and pushed down to both compress and to torsionally load the coil spring 17, and the three spacer studs 18 are guided through the corresponding holes 19 of the fixed sheave 6f until the end surface portions thereof come into abutting contact with the movable sheave 6m. The aforementioned plural locking holes 26, of course, can be selected to adjust the initial torsional force of the coil spring 17.

Now, if the inclined cam grooves 22 of the spring cap had been equal in length to the grooves 23, the balls 24 resting at the lowermost ends of the aforementioned inclined cam grooves 23 would come into contact with the grooveless wall portions of the spring cap 16 when an attempt is made to bring the end portions of the spacer studs 18 of the spring cap 16 into contact with the movable sheave 6m. The balls contacting the grooveless wall portion of the spring cap will prevent the contact of the end portions of the spacer studs and preclude assembly of the nut 21. In order to effect the correct contact, it would be necessary to manually displace the balls 24 from the lower ends in the aforementioned inclined cam grooves 23. It is, however, extremely difficult for an assembly person to effect the upward shift or displacement of the three balls 24, considering they are in a blind state, being covered from view by the inclined cam grooves 22 of the spring cap 16. By making the groove 22 longer the extension 22a can be positioned on the upper hemisphere of the balls 24 even when the balls 24 remain at the lowermost ends of the inclined cam grooves 23 (FIG. 6a). This expedient simplifies the assembly to a remarkable extent.

When the end butt portions of the spacer studs 18 of the spring cap 16 are brought into close contact with the movable sheave 6m, the spring cap 16 can be fastened at its contacting portions by means of the stud bolts 20 and the nuts 21. In this assembled state, a land 31 formed on the movable sheave or pulley half 6m is fitted in a recess 30 which is formed in the fixed sheave 6f. The land 31 coacting with the recess 30 prevents the rotational movement of the movable sheave upon an application of reverse torque, such as is required when replacing a worn V-belt, from exceeding an amount in which the balls could become free of the confines of the grooves and fall out and become lost in the snow or the like.

With continued reference to FIG. 6A of the drawings, the spring force $T_1$ exerted by the compressed spring 17 between the fixed sheave 6f and the spring cap 16 causes the spring cap 16 to be spaced from the fixed sheave 6f. Moreover, the torsional force exerted by the coil spring 17 exerts a force on the fixed sheave or pulley half 6f opposite to the torsion of the coil spring. As a result, the balls 24 are subjected to such pushing forces from the inclined cam grooves 22 and 23 from both directions that the balls 24 are securely clamped in place.

When the V-belt 7 is to be installed on the driven pulley 6, the spring cap 16 is moved together with the movable sheave or pulley half 6m in the axial direction while being turned to the position where the effective diameter of the driven pulley 6 is a minimum. Here, the balls 24 come to the uppermost ends of the inclined cam grooves 22, while being held at the lowermost ends of the inclined cam grooves 23, as shown in FIG. 6B.

Next, after the V-belt 7 has been installed, under the force of the spring 17, the spring cap 16 moves in the axial direction, while being turned in the direction which is opposite to the direction which it is turned when placing the V-belt on it. The spring cap, along with the movable sheave or pulley half 6m, moves to the point where the effective diameter of the driven pulley 6 becomes a maximum. Then, as shown in FIG. 6C, the balls 24 move to the uppermost ends of the inclined cam grooves 23, but to only the middle positions with respect to the inclined cam grooves 22. As a result, when, during use, the aforementioned torque responsive mechanism conducts its reaction to the torque fluctuations of the driven shaft, the balls 24 do not move into the extended groove portions 22a, but remain within the range corresponding to the aforementioned length L.

The torque responsive mechanism mounted in the V-belt type continuously variable transmission of the present invention has the balls 24 held between the inclined cam grooves 22 formed in the spring cap 16 and the inclined cam grooves 23 formed in the fixed sheave 6f. As a result, both the inclined cam grooves 22 and 23 move relative to each other with rolling friction between. Hence, the transmission of the present invention is not subjected to the type of high sliding friction between the mating cam faces as in the prior art. Thus, when the torque load upon the driven shaft 13 fluctuates, the inclined cams move freely and rapidly relative to each other, thereby greatly improving the torque response characteristics of the system.

Because the inclined cam grooves 22 and 23 are of different length, i.e., the inclined cam grooves 22 at the side of the spring cap 16 are made longer than the inclined cam grooves 23 at the side of the fixed sheave or pulley half 6f by the extended groove portions 22a, the assembly of roller members (spheres 24) into the grooves of the driven pulley 6 is simplified.

The invention has been described herein in considerable detail in order to comply with the Patent Statutes and to provide those skilled in the art with the information needed to apply the novel principles, and to construct and use such specialized components as are required. Hence, it is to be understood that the invention can be carried out by specifically different equipment and devices, and that various modifications, both as to equipment details and operating proceduress, can be accomplished without departing from the scope of the invention itself.

What is claimed is:

1. In a V-belt, continuously variable transmission of the type including an engine-driven drive shaft, a drive pulley including a fixed sheave fixed axially of said drive shaft, a movable sheave axially displaceable of said drive shaft, and a speed responsive mechanism operatively coupled to said movable sheave for varying its spacing from said fixed sheave as a function of engine speed, a driven shaft, a driven pulley including a fixed sheave fixed axially of said driven shaft, a movable sheave movable axially of said driven shaft, a V-belt spanning said drive pulley and said driven pulley, and an improved torque responsive mechanism operatively coupled to said movable sheave of said driven pulley for varying its spacing from said fixed sheave of said driven pulley as a function of torque applied to said driven shaft, comprising:

(a) a spring cap disposed on said driven shaft on one side of said fixed sheave of said driven pulley and having a plurality of arcuate, inclined cam surfaces projecting in the axial direction at equally spaced radial locations from one side surface thereof, said cam surfaces each including an arcuate groove therein, said arcuate, inclined cam surfaces extending through openings formed in said fixed sheave of said driven pulley and attached to said movable sheave of said driven pulley positioned on the side of said fixed sheave of said driven pulley which is opposite said spring cap;

(b) said fixed sheave of said driven pulley including arcuate projections extending from one side thereof proximate said openings in said fixed sheave of said driven pulley, said projections each defining a groove in said cam surface sloping in the axial direction and each including an arcuate groove therein and being in circumferential alignment with said arcuate cam surfaces projecting from said spring cap, the arcuate grooves in said arcuate cam surfaces projecting from said spring cap being longer circumferentially than said arcuate grooves formed in said cam surfaces of said arcuate projections of said fixed sheave of said driven pulley;

(c) a compression spring extending between said spring cap and said fixed sheave of said driven pulley for exerting a separating force therebetween; and (d) a plurality of rolling members individually contained in said arcuate grooves of said arcuate cam surfaces projecting from said spring cap and said arcuate grooves in said arcuate projections of said fixed sheave of said driven pulley, whereby when a torque load on said driven shaft changes, the aligned cam surfaces of said spring cap and said fixed sheave of said driven pulley move relative to one another with rolling friction therebetween to vary the spacing between said movable sheave and fixed sheave of said driven pulley.

2. A V-belt, continuously variable transmission according to claim 1 wherein said spring cap and said fixed sheave of said driven pulley each include three equally distributed inclined cam grooves.

3. A V-belt, continuously variable transmission according to claim 1 wherein said compression spring is a coil spring.

4. A V-belt, continuously variable transmission according to claim 1 wherein said roller members are spheres.

5. A V-belt, continuously variable transmission according to claim 4 wherein said spheres are made of a self-lubricating material.

6. A V-belt, continuously variable transmission according to claim 1 wherein said transmission is interposed between the engine and the drive track of a snowmobile.

7. A V-belt, continuously variable transmission according to claim 3 wherein said coil spring is fixed at one end to said fixed sheave of said driven pulley and at its other end to said spring cap, said coil spring being preloaded with a predetermined torsional force.

8. A V-belt, continuously variable transmission according to claim 2 wherein means are provided on said fixed and movable sheaves of said driven pulley for limiting the extent of separation occurring between said arcuate grooves in said cam surfaces projecting from said spring cap and in said arcuate projection of said fixed sheave to less than the point where said roller members would no longer be captured in said arcuate grooves of said cam surfaces of said spring cap and of said fixed sheave.

* * * * *